(12) United States Patent
Yu et al.

(10) Patent No.: US 6,750,927 B2
(45) Date of Patent: Jun. 15, 2004

(54) LIQUID CRYSTAL DISPLAY WITH ELECTRIC GRAPHIC INPUT PANEL

(75) Inventors: Hwan Seong Yu, Gumi-shi (KR); Joo Soo Lim, Gumi-shi (KR)

(73) Assignee: LG. Philips LCD Co., LTD, Seoul (KR)

( * ) Notice: Subject to any disclaimer, the term of this patent is extended or adjusted under 35 U.S.C. 154(b) by 0 days.

(21) Appl. No.: 10/028,670

(22) Filed: Dec. 28, 2001

(65) Prior Publication Data

US 2002/0109803 A1 Aug. 15, 2002

(30) Foreign Application Priority Data

Dec. 28, 2000 (KR) .................... P2000-084115

(51) Int. Cl.$^7$ .......................... G02F 1/1333
(52) U.S. Cl. ..................... 349/58; 345/173
(58) Field of Search ............ 349/58, 61; 361/681; 345/173

(56) References Cited

U.S. PATENT DOCUMENTS

| | | | | | |
|---|---|---|---|---|---|
| 5,402,151 | A | * | 3/1995 | Duwaer | 345/173 |
| 5,990,874 | A | * | 11/1999 | Tsumura et al. | 345/173 |
| 6,016,134 | A | * | 1/2000 | Ota | 345/104 |
| 6,067,133 | A | * | 5/2000 | Niibori et al. | 349/60 |
| 6,124,919 | A | * | 9/2000 | Kubo et al. | 349/162 |
| 6,215,477 | B1 | * | 4/2001 | Morrison et al. | 345/173 |
| 6,480,753 | B1 | * | 11/2002 | Calder et al. | 700/83 |
| 6,504,713 | B1 | * | 1/2003 | Pandolfi et al. | 361/695 |
| 2002/0054261 | A1 | * | 5/2002 | Sekiguchi | 349/122 |

FOREIGN PATENT DOCUMENTS

| | | |
|---|---|---|
| JP | 88-55330 U | 4/1988 |
| JP | 10073805 A | 3/1998 |
| JP | 10-161116 A | 6/1998 |
| JP | 2000330096 A | 11/2000 |

* cited by examiner

Primary Examiner—Carl Whitehead, Jr.
Assistant Examiner—Stephen W. Smoot
(74) Attorney, Agent, or Firm—Birch, Stewart, Kolasch & Birch, LLP

(57) ABSTRACT

An LCD (Liquid Crystal Display) fitted with an EGIP (Electric Graphic Input Panel) is provided. The LCD includes a crystal panel, a light plate, and a light source, which are encased in a case. The EGIP is fitted over the liquid crystal panel and the case. Eventually, a dead space in the range of 6–7 mm is secured to permit an easy repair of the EGIP, to prevent electric short occurrence of the touch panel electrodes, and to allow formation of a touch panel electrode with more than five lines.

23 Claims, 5 Drawing Sheets upper part electrode wiring lower part electrode wiring lower part electrode wiring lower part electrode wiring

LIQUID CRYSTAL DISPLAY WITH ELECTRIC GRAPHIC INPUT PANEL

RELATED APPLICATION

The present application claims the benefit of Korean Patent Application No. P2000-84115 filed Dec. 28, 2000, under 35 U.S.C. §119.

BACKGROUND OF THE INVENTION

1. Field of the Invention

The present invention relates to a liquid crystal display, and more particularly, to a liquid crystal display (LCD) with an electric graphic input panel (EGIP).

2. Discussion of the Related Art

In general, an LCD is provided with a liquid crystal panel having liquid crystal injected between upper and lower glass substrates, polarization plates on both sides of the liquid crystal panel for polarizing a light, a light source for generating the light, and a light plate for supplying a back light to the liquid crystal panel to display an external picture signal.

The lower glass substrate of the liquid crystal panel is provided with a plurality of gate lines extending in one direction at fixed intervals, data lines formed perpendicular to the gate lines at fixed intervals to define pixel regions, a matrix of the pixel regions between the gate lines and the data lines, a pixel electrode in each of the pixel regions, and a thin film transistor (TFT) in each of the pixel regions and having a gate electrode connected to the corresponding gate line, a source electrode connected to the corresponding data line, and a drain electrode connected to the pixel electrode. The TFT is turned on/off in response to a signal on the gate line. The upper glass substrate is provided with a color filter layer, a black matrix layer, and/or a common electrode. The upper and lower glass substrates are bonded together with a gap between the two substrates, into which the liquid crystal is injected.

The foregoing LCD is also provided with a device called EGIP (Electric Input Graphic Panel) for displaying a picture and providing an electrical graphics signal to the displayed picture. An LCD system fitted with an EGIP POL will be explained. FIG. 1 illustrates a section of a related art integrated type EGIP POL 12, and FIG. 2 illustrates a sectional view of a related art LCD with the EGIP POL of FIG. 1.

Referring to FIG. 1, integrated type EGIP POL 12 according to the related art is provided with PET (Polyethylene terephthalate) films 1 and 2 bonded together with a gap therebetween, and a transparent electrode ITO 3 or 4 formed on the opposite su faces of the PET films 1 and 2. There is a PVA (Polyvinyl Alcohol) film 5 under the lower PET film 2 for polarizing a light, a TAC (Triacetyl Cellulose) film 6 under the PVA film 5 for protecting the PVA film 5 from humidity and the like and a sliver line layer A/G 7 on the upper PET film 1. In the above EGIP POL 12, the PVA film 5 and the TAC film 6 are called as POL (Polarizer) collectively, and the PET films 1 and 2 and the A/G layer 7 are called as an EGIP film collectively.

A related art LCD with the EGIP POL of FIG. 1 is illustrated in FIG. 2.

As explained, the related art LCD with the EGIP POL is provided with a liquid crystal panel 11 having the upper and lower substrates and the liquid crystal layer therebetween, the integrated type EGIP POL 12 fitted on the liquid crystal panel 11, a lower polarization plate 13 fitted under the liquid crystal panel 11, and a top case 16 having a light plate 14 under the lower polarization plate 13 and a light source 15 for providing the light to the light plate 14. The tope case 16 cases the integrated type EGIP POL 12, the liquid crystal panel 11, the lower polarization plate 13, the light plate 14, and the light source 15. This related art LCD with the EGIP POL is identical to a general LCD if the EGIP POL 12 is removed. Accordingly, the related art LCD with the EGIP POL is a general LCD provided with the EGIP POL 12 all encased with the top case 16.

The size of the EGIP POL 12 is the same as the size of the upper plate of the liquid crystal panel 11. The EGIP POL 12 is provided with electrode wirings such as a four lined resistance film type as shown in FIGS. 3A and 3B to provide a touch panel function. For example, as shown in FIG. 3A, the transparent electrode ITO 3 attached to the upper PET film 1 as shown in FIG. 1 has two silver (Ag) wirings X1 and X2 at opposite ends thereof in an X-axis direction. As shown in FIG. 3B, the transparent electrode ITO 4 attached to the lower PET film 2 has two silver (Ag) wirings Y1 and Y2 at opposite ends thereof in a Y-axis direction. Each silver wiring is formed in a dead space (approximately 2–3 mm) part of the LCD (FIG. 2) in one direction. Data can be applied to the LCD through the electrode wirings without a keyboard or a mouse and the LCD can display a picture signal and have a function of a touch panel. The touch panel of the four lined resistance film type requires two signal readings for detecting a position, i.e., one reading to read an X-axis value, and another reading to read a Y-axis value.

However, the foregoing related art LCD with the EGIP POL has the following problems.

First, although the top case 16 encasing the EGIP POL serving as the touch panel helps to reduce malfunctions and errors to the LCD, it is difficult to repair the EGIP if it becomes defective, because the repair is complicated since the top case needs to be disassembled to access the EGIP.

Second, the dead space of the LCD is limited to be below 2–3 mm because a larger dead space for providing an adequate wiring space reduces a display area. Therefore, the formation of the touch panel electrodes in the limited dead space results in a high probability of electric short occurrences between the touch panel electrodes.

Third, although the electrode wiring having a multi-lined resistance film type, rather than the four lined resistance film type, can provide a faster response, the limited dead space impedes formation of the electrode wiring having the multi-lined resistance film type in the LCD.

SUMMARY OF THE INVENTION

Accordingly, the present invention is directed to an LCD with an EGIP that substantially obviates one or more of the problems due to limitations and disadvantages of the related art.

An object of the present invention is to provide an LCD with an EGIP, which permits an easy repair of the EGIP and formation of five lined resistance film type wiring.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display with an EGIP (Electric Graphic Input Panel) according to an embodiment of the present invention includes the LCD having a liquid crystal panel, a light plate and a light source, a case for encasing the LCD, and an integrated type EGIP POL fitted over the liquid crystal panel and the case.

In one aspect of the present invention, there is provided an LCD with an EGIP, including a liquid crystal panel having a lower substrate with a dummy pad formed thereon, a light plate, and a light source for supplying a back light to the liquid crystal panel; a case for encasing the lower substrate of the liquid crystal panel, the light plate, and the light source; and an integrated type EGIP POL fitted over the liquid crystal panel and the case.

In another aspect of the present invention, there is provided an LCD with an EGIP including a separated POL, the LCD having a liquid crystal panel, a light plate and a light source, a case for encasing the separated POL and the LCD, and an EGIP film fitted over the separated POL and the case.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 6A–6C illustrate sectional views each showing an LCD with an EGIP in accordance with a third preferred embodiment of the present invention, wherein FIG. 6A illustrates a sectional view of an integrated type EGIP POL separated into an EGIP film and a POL, FIG. 6B illustrates a sectional view of an LCD with separated EGIP film and POL, and FIG. 6C illustrates a sectional view of an LCD with the EGIP film in place;

DETAILED DESCRIPTION OF THE PREFERRED EMBODIMENTS

Figure 1:
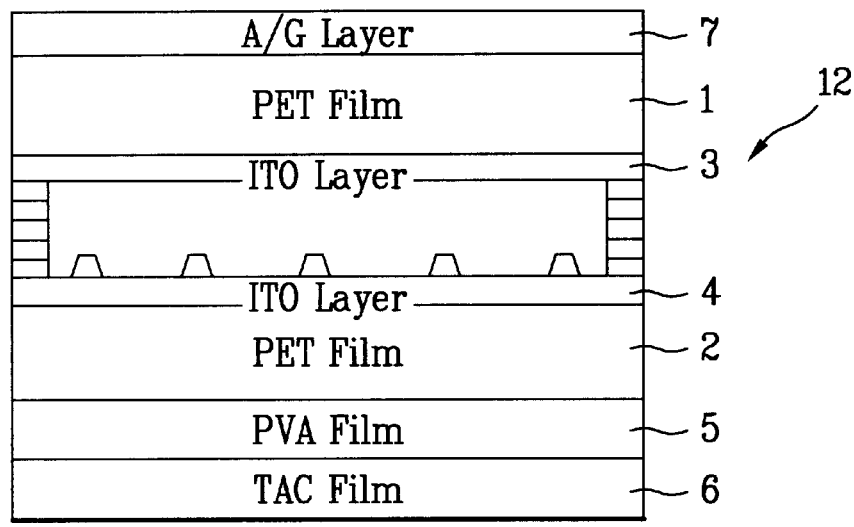
FIG. 1 illustrates a sectional view of a related art integrated type EGIP POL.
Figure 2:
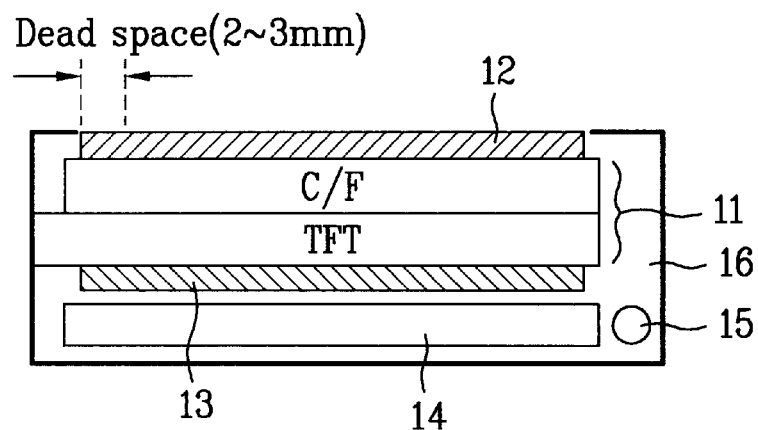
FIG. 2 illustrates a sectional view of a related art LCD with the EGIP POL of FIG. 1.
Figure 3A:
FIGS. 3A–3B illustrate plan views each showing related art touch panel electrodes of four lined resistance film type.
Figure 3B:
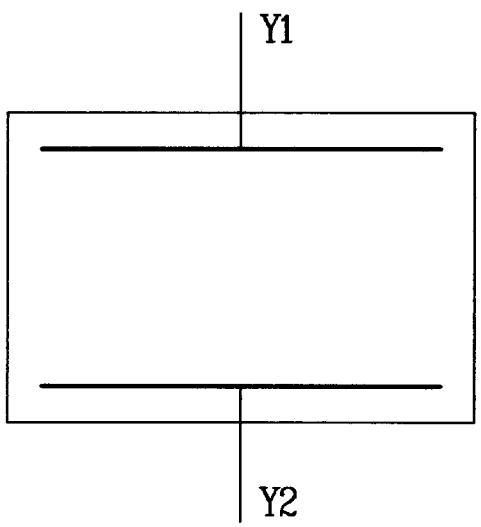
Figure 4:
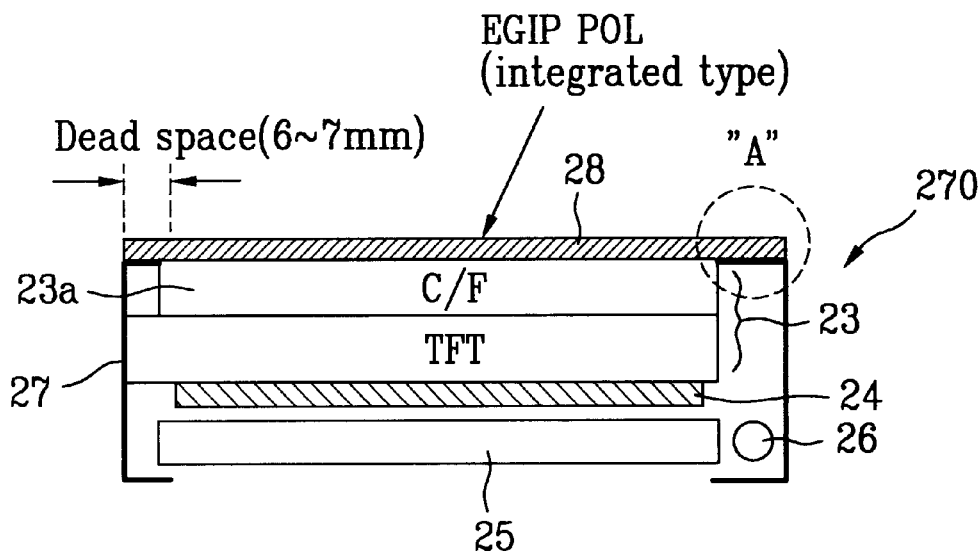
FIG. 4 illustrates a sectional view of an LCD with an EGIP POL in accordance with a first preferred embodiment of the present invention.

Reference will now be made in detail to the preferred embodiments of the present invention, examples of which are illustrated in the accompanying drawings. FIG. 4 illustrates a sectional view of an LCD with an integrated EGIP POL in accordance with a first preferred embodiment of the present invention. As shown in FIG. 4, the LCD with the EGIP POL in accordance with the first preferred embodiment of the present invention includes an integrated type EGIP POL 28 fitted to a cased LCD 270, wherein a liquid crystal panel 23, a lower polarization plate 24, a light plate 25, and a light source 26 are cased in a top case 27. The integrated type EGIP POL 28 is fitted over an upper glass substrate of the liquid crystal panel 23a and the top case 27. Preferably, the EGIP POL 28 has the same structure as the one shown in FIG. 1; however, any other integrated type EGIP POL may be used. The upper surface of the upper glass substrate 23a of the liquid crystal panel 23 and the upper surface of the top case 27 are aligned to each other and do not overlap each other. Thus, the EGIP POL 28 covers the top surfaces of the top case 27 and the upper glass substrate 23a. This type of EGIP fitting allows securing at least 6–7 mm dead space for the LCD, which is much greater than the related art dead space, without reducing the size of the actual display area.

Figure 5:
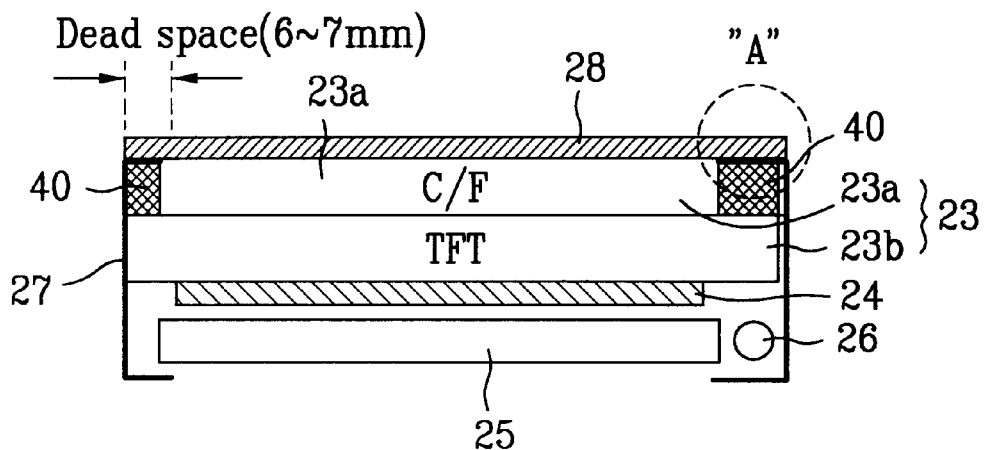
FIG. 5 illustrates a sectional view of an LCD with an EGIP POL in accordance with a second preferred embodiment of the present invention.

FIG. 5 illustrates a sectional view of an LCD with an integrated type EGIP POL in accordance with a second preferred embodiment of the present invention.

Referring to FIG. 5, the LCD with the EGIP POL in accordance with the second preferred embodiment of the present invention includes a dummy pad 40 formed on a lower glass substrate 23b of a liquid crystal panel 23 without a driving IC; the liquid crystal panel 23 having lower and upper glass substrates 23a and 23b, a lower polarization plate 24, a light plate 25, and a light source 26, which are cased in a top case 27; and an integrated type EGIP POL 28 as shown in FIG. 4 fitted over the upper glass substrate 23a of the liquid crystal panel 23, and the top case 27. In this embodiment, the upper glass substrate 23a has a size smaller than the lower glass substrate 23b of the panel 23 such that the sides of the upper and lower glass substrates 23a and 23b are not aligned each other. The dummy pad 40 essentially fills this empty spacing above the edges of the lower substrates 23b. The top case 27 also encases the dummy pad 40. In one embodiment, the dummy pad 40 is formed on a part of the lower substrate 23b where no driving IC is provided. Similar to the first embodiment, the upper surface of the upper glass substrate 23a of the liquid crystal panel 23 and the upper surface of the top case 27 are aligned to each other as set forth in the circle A. This type of EGIP fitting allows securing of at least 6–7 mm dead space in the LCD in accordance with the second embodiment without reducing the size of the display area. The dummy pad 40 (a projection from the lower glass substrate 23b) does not affect the display area of the LCD.

Figure 6A:
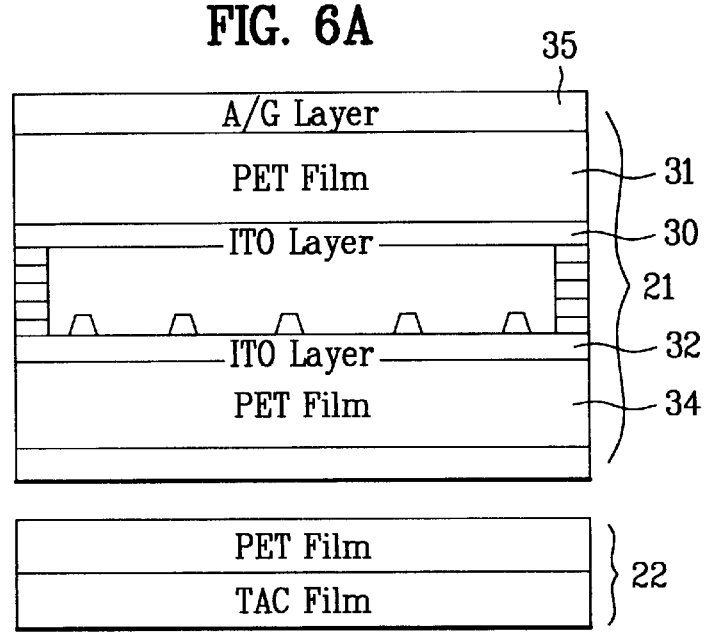
Figure 6B:
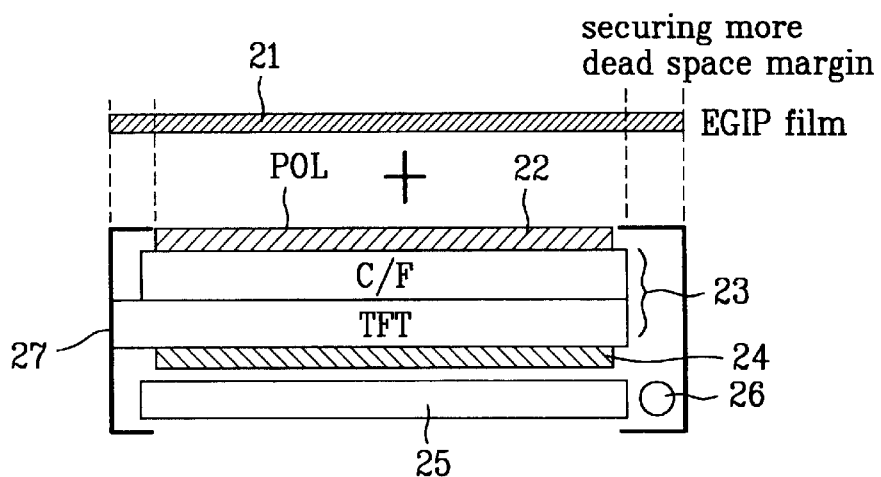
Figure 6C:
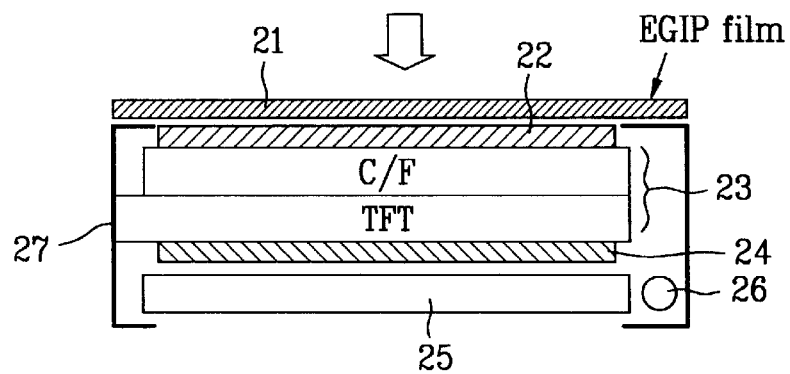

FIGS. 6A–6C illustrate sectional views associated with a third preferred embodiment of the present invention, wherein FIG. 6A illustrates a sectional view of an integrated type EGIP POL that has been separated into an EGIP film and a POL, FIG. 6B illustrates a sectional view of an LCD with the separated EGIP film and POL, and FIG. 6C illustrates a sectional view of the LCD of FIG. 6B with the EGIP film in place.

Referring to FIG. 6A, the LCD with an EGIP POL in accordance with the third preferred embodiment of the present invention includes the EGIP POL separated into an EGIP film 21 and a POL 22. The different layers of the EGIP film 21 and POL 22 correspond to the layers shown in FIG. 1. For instance, the EGIP film 21 includes PET films 31 and 34, transparent electrode ITO layers 30 and 32, and a A/G layer 35. The POL 22 includes a PET film and a TAC film. As shown in FIG. 6B, the separated POL 22 is fitted to the top of an LCD including a liquid crystal panel 23 with upper and lower glass substrates and a liquid crystal layer injected between the upper and lower glass substrates, a lower polarization plate 24, a light plate 25, and a light source 26. The POL 22, the liquid crystal panel 23, the lower polarization plate 24, the light plate 25, and the light source 26 are encased in a top case 27. The upper surfaces of the POL 22 and the top case 27 are made to align with each other, while the top case 27 avoids overlapping with the POL 22 as much as possible.

Then, as shown in FIG. 6C, the separate EGIP film 21 is attached over the upper surfaces of the POL 22 and the top case 27 of the cased LCD to complete the fabrication of the LCD with the EGIP. The EGIP film 21 is formed such that the outer edges of the EGIP film 21 are aligned with the outer edges of the top case 27 having the LCD. Since the EGIP film 21 is attached over both the top case 27 and the POL 22, the third embodiment LCD of the present invention can effectively secure a dead space in a range of at least 6–7 mm.

In still another embodiment, the dummy pad of FIG. 5 may be provided on the lower substrate of the panel 23 (as in FIG. 5) in the LCD of FIG. 6.

Figure 7:
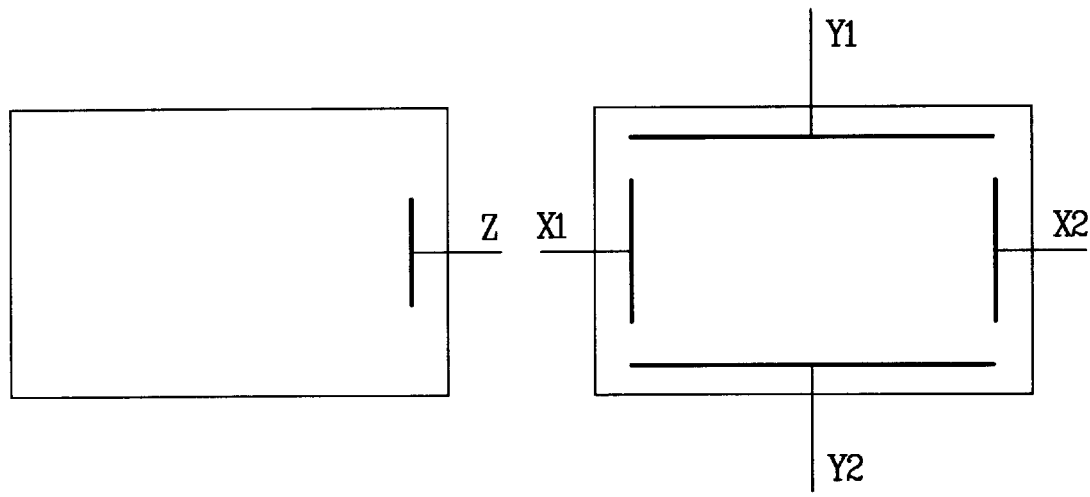
FIG. 7 illustrates a plan view of touch panel electrodes of a five lined resistance film type according to the present invention.
Figure 8:
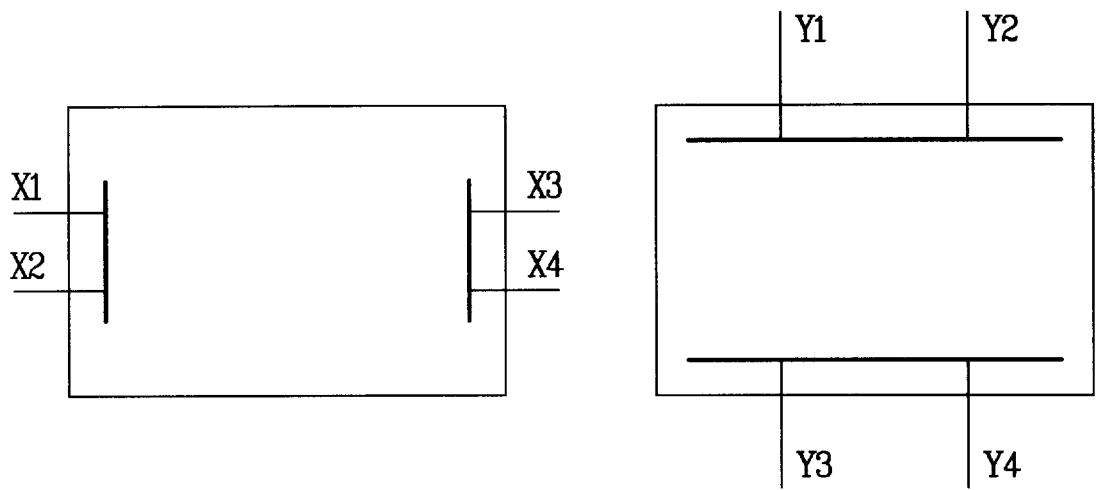
FIG. 8 illustrates a plan view of touch panel electrodes of an eight lined resistance film type according to the present invention.

Thus, since each of the embodiments of the present invention permits securing a sufficient dead space for the LCD, e.g., in the range of 6–7 mm, the present invention permits forming a touch panel wiring of a more than 5 lined resistance film type, as shown in FIGS. 7 and 8 for the LCD of FIGS. 4, 5 and 6. Particularly, FIG. 7 illustrates a top plan view of touch panel electrodes of a five lined resistance film type according to the present invention, and FIG. 8 illustrates a top plan view of touch panel electrodes of an eight lined resistance film type according to the present invention.

Referring to FIG. 7, the touch panel electrodes of a five lined resistance film type in the LCD of the present invention includes one silver (Ag) wiring Z formed in an X-axis or Y-axis direction at one end of the upper transparent electrode ITO layer directly beneath the upper PET film of the EGIP 21 or 28, and four silver wirings X1, X2, Y1 and Y2 formed in X-axis and Y-axis directions at opposite ends of the lower transparent electrode ITO layer directly on the lower PET film. The silver wirings at the upper or lower PET film are formed in the 6–7 mm of dead space of the LCD.

Referring to FIG. 8, the touch panel electrodes of an eight lined resistance film type in the LCD of the present invention includes two silver (Ag) wirings X1 and X2 or X3 and X4 formed in the X-axis direction at each of the opposite ends of the upper transparent electrode ITO layer fitted to the upper PET film of the EGIP 21 or 28 (four in total), and two silver (Ag) wirings Y1 and Y2 or Y3 and Y4 formed in the Y-axis direction at each the opposite ends of the lower transparent electrode ITO layer fitted to the lower PET film (four in total). The silver wirings at the upper or lower PET film are formed in the 6–7 mm of dead space of the LCD. The touch panel electrodes of more than 5 lined resistance film type permit reading of X-axis and Y-axis coordinates at the same time, or more accurately.

As explained above, the LCD with the EGIP (e.g., integrated type EGIP POL or separated EGIP) of the present invention has at least the following advantages.

First, the exclusion of the EGIP from being encased in the top case permits an easy repair of the EGIP when a defect occurs at the EGIP.

Second, the formation of the EGIP over the top case and the top surface of the LCD secures a dead space in the range of, e.g., 6–7 mm.

Third, the 6–7 mm of dead space made available by the present invention allows formation of a touch panel of a resistance film type with more than 5 lines.

Fourth, the formation of a touch panel of a resistance film type with more than 5 lines provided by the present invention allows faster and more accurate reading of touch coordinates.

Fifth, the large dead space of 6–7 mm provided by the present invention prevents occurrence of electric shorts between the touch panel electrodes compared to the related art touch panel electrodes.

It will be apparent to those skilled in the art that various modifications and variations can be made in the LCD with an EGIP of the present invention without departing from the spirit or scope of the invention. Thus, it is intended that the present invention cover the modifications and variations of this invention provided they come within the scope of the appended claims and their equivalents.

What is claimed is:

1. A display device with an Electric Graphic Input Panel (EGIP), comprising:

a liquid crystal panel;

a case for encasing the liquid crystal panel; and an integrated type EGIP POL disposed over the liquid crystal panel and the case, wherein the entire integrated type EGIP POL is disposed above the case.

2. The display device as claimed in claim 1, wherein upper surfaces of the liquid crystal panel and the case are aligned to each other.

3. The display device as claimed in claim 1, wherein the liquid crystal panel and the case do pot overlap each other.

4. The display device as claimed in claim 1, wherein the integrated type EGIP POL is of an N lined resistance film type where N is greater than 4.

5. The display device as claimed in claim 1, further comprising:

a light plate and a light source both encased in the case.

6. The display device as claimed in claim 1, wherein outer edges of the integrated type EGIP POL are aligned with outer edges of the case.

7. A display device with an Electric Graphic Input Panel (EGIP), comprising:

a liquid crystal panel;

a case for encasing the liquid crystal panel; and an integrated type EGIP POL disposed over the liquid crystal panel and the case, wherein upper surfaces of the liquid crystal panel and the case are aligned to each other.

8. The display device as claimed in claim 7, wherein the liquid crystal panel includes a lower substrate with a dummy pad formed on the lower substrate.

9. A display device with an Electric Graphic Input Panel (EGIP), comprising:

a liquid crystal panel;

a case for encasing the liquid crystal panel; and an integrated type EGIP POL disposed over the liquid crystal panel and the case, wherein the integrate type EGIP POL includes outer edges formed to align with outer edges of the case.

10. A display device with an EGIP, comprising:

a liquid crystal panel having a lower substrate with a dummy pad formed on the lower substrate;

a case for encasing the liquid crystal panel; and an integrated type EGIP POL disposed over the liquid crystal panel and the case, wherein the entire integrated type EGIP POL is disclosed above the case.

11. The display device as claimed in claim 10, wherein upper surfaces of an upper substrate of the liquid crystal panel and the case are aligned to each other.

12. The display device as claimed in claim 10, wherein the dummy pad is formed on a part of the lower substrate of the liquid crystal panel where no driving IC is provided.

13. The display device as claimed in claims 10, wherein the integrated type EGIP POL is of an N lined resistance film type where N is greater than 4.

14. The display device as claimed in claim 10, further comprising:

a light plate and a light source both encased in the case.

15. A display device with an EGIP, comprising:

a liquid crystal panel;

a separate POL formed on the liquid crystal panel;

a case for encasing the POL and the liquid crystal panel; and a separate EGIP film formed over the POL and the case, wherein the entire EGIP film is disposed above the case.

16. The display device as claimed in claim 15, wherein upper surfaces of the POL and the case are aligned to each other.

17. The display device as claimed in claim 15, wherein the POL and the case do not overlap each other.

18. The display device as claimed in claim 15, wherein the POL has a size smaller than the EGIP film.

19. The display device as claimed in claim 15, wherein the EGIP film includes outer edges formed to align with outer edges of the case.

20. The display device as claimed in claim 15, wherein the EGIP film is of an N lined resistance film type where N is greater than 4.

21. The display device as claimed in claim 15, further comprising:

a light plate and a light source both encased in the case.

22. A display device with an EGIP, comprising:

a liquid crystal panel;

a separate POL formed on the liquid crystal panel;

a case for encasing the POL and the liquid crystal panel; and a separate EGIP film formed over the POL and the case, wherein upper surfaces of the POL and the case are aligned to each other.

23. A display device with an EGIP, comprising:

a liquid crystal panel;

a separate POL formed on the liquid crystal panel;

a case for encasing the POL and the liquid crystal panel; and a separate EGIP film formed over the POL and the case, wherein the EGIP film includes outer edges formed to align with outer edges of the case.

* * * * *